March 11, 1947. E. M. MOREHOUSE 2,417,261
HARNESS CLIP WITH SAFETY LOCK
Filed June 2, 1944
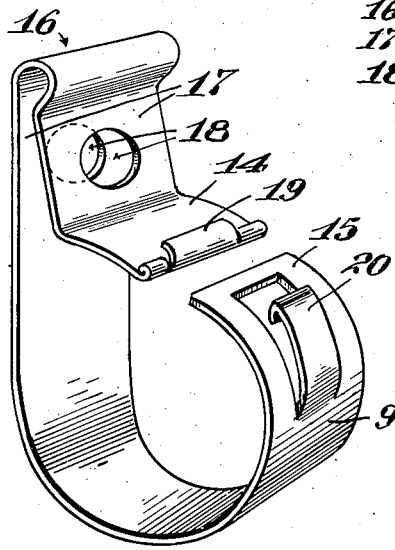
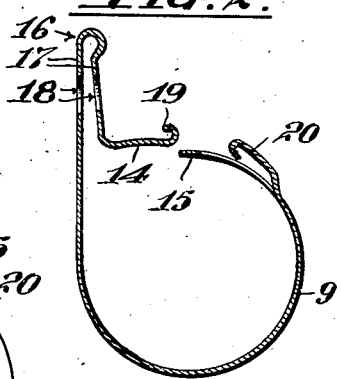
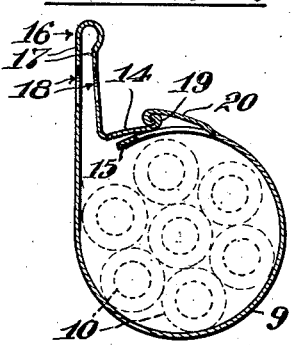
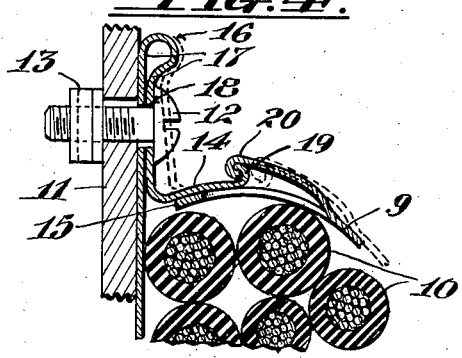
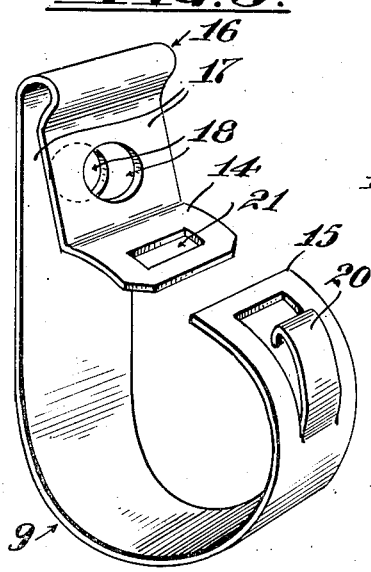
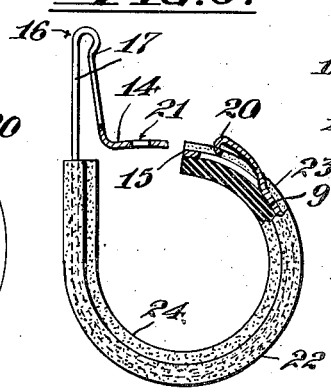
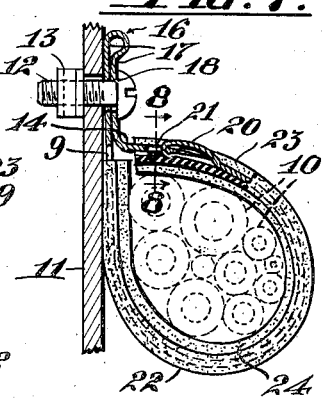
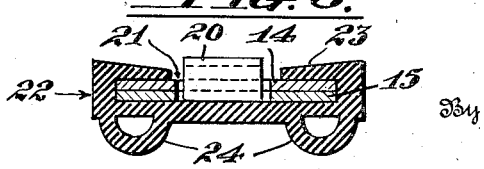
Inventor
Eugene M. Morehouse
By R. S. Berry
Attorney Patented Mar. 11, 1947

2,417,261

UNITED STATES PATENT OFFICE 2,417,261

HARNESS CLIP WITH SAFETY LOCK

Eugene M. Morehouse, Tujunga, Calif., assignor to Adel Precision Products Corp., a corporation of California Application June 2, 1944, Serial No. 538,468

4 Claims. (Cl. 248—74)

This invention relates to clips for supporting wires or conduits, as in aircraft and the like where the various electrical conductor and conduit lines are subjected to constant vibration and are therefore fastened at closely spaced intervals by means of such clips to structural parts past or adjacent which such lines are extended, in order to protect the lines against wear, damage and derangement and securely hold them in the desired positions.

More particularly this invention relates to the snap-lock type of clips in which a normally open wire or conduit-embracing loop is automatically locked in clamped position around the wires or conduit by forcing the ends of the loop together to interlock cooperating latch or lock elements provided at said ends.

The primary object of the present invention is to provide a clip of this type which has a novel form of lock means embodying a safety arrangement to prevent accidental release of the lock means and consequent opening of the clip.

Another object of my invention is to provide in a clip of the character described a novel form of attaching ear for securing the clip to a support, by means of which, upon the application of a fastener, the loop is constructed and tightly clamped around the wires or conduit, and the lock elements are brought into tighter and more effective interlocking relation.

A further object of my invention is to provide a clip of the character described in which a spring metal strap is bent to form an open loop having cooperating fastening elements on the free ends thereof adapted to interlock so that a portion of one end underlies and contacts the other end while another portion of said one end overlies and is hooked to said other end whereby the ends are positively interlocked against accidental release, but may be easily unlocked upon manipulating one end in a particular manner.

Another object of my invention is to provide a clip such as described in which a cushion strip for protecting the object held in the clip cooperates with the locking means to assure a reliable action thereof as well as an effective clamping of the clip around the supported object.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a clip embodying my invention;

Fig. 2 is a vertical sectional view of the clip shown in Fig. 1;

Fig. 3 is a vertical sectional view of the clip as it would appear when locked around a group of wires preliminary to the mounting of the clip on a support;

Fig. 4 is an enlarged fragmentary sectional view of the clip as it would appear when installed;

Fig. 5 is a perspective view of a modified form of the clip;

Fig. 6 is a part side elevation, part sectional view of the clip shown in Fig. 5 as when provided with a cushion;

Fig. 7 is a side elevation partly in section of the clip shown in Fig. 6 as it would appear when installed;

Fig. 8 is an enlarged sectional view taken on the line 8—8 of Fig. 7.

Referring to the drawing more specifically, it will be apparent that a clip embodying my invention may be made of a spring metal strap bent to form a loop or band 9 for embracing wires 10 or a conduit, not shown, and adapted to be secured to a support 11 by means of a bolt 12 and nut 13 as shown in Fig. 4.

As shown in Figs. 1 and 2 the loop 9 is normally open so that its free ends 14 and 15 are spaced apart and adapted to be brought into overlapped and locked relation to one another to close the loop and clamp it around the wires or conduit as shown in Fig. 3.

At a point intermediate its end but nearer to thte end 14, the strap is bent outwardly from the loop in the form of a doubled attaching ear 16 of substantially an inverted V-shape with its opposed legs 17 provided with aligned openings 18 for reception of the bolt 12. It should be noted that the outer leg 17 and the contiguous portion of the loop are flat and substantially straight so as to effectively seat against the support 11 as shown in Fig. 4.

As shown in Figs. 1 to 4 inclusive the end 14 is bent outward and back on itself to form a hook fastening element 19 adapted to interlock with a tongue-like hook fastening element 20 at the end 15 as shown in Fig. 3. The hook 20 is struck out from the loop like a tongue at a point spaced inwardly of the end 15 and except where joined to the loop, lies in outwardly spaced relation to the end 15 with its bill turned inwardly. Therefore when the hooks 19 and 20 are hooked together the end 15 will lie under and against the end 14 while the hook 20 is hooked over the hook 19 and overlies the end 14. This "straddling" of the end 14 prevents the end 15 from being moved inwardly or outwardly relative to the end 14 and vice versa and therefore prevents accidental unhooking and releasing of said ends. The ends 14 and 15 as well as the hook 20 are subject to ready flexure so that on bringing the ends of the loops together, the hook 19 on the end 14 will extend between the end 15 and the overlying hook 20, and on slightly depressing the latter, the two hooks will interlock with a snap action.

To unhook the ends 14 and 15 they are relatively slidably moved while in straddled relation, or the end 15 is moved so as to slide inwardly in an arcuate path while straddling the end 14, to move the hook 20 away from hook 19 whereupon the hook 20 will spring outwardly, free of the hook 19, it being sometimes necessary to slightly depress the end 14 to disengage the hooks.

Upon tightening the screw or bolt 12 the legs 17 of the ear 16 are forced together as indicated in Fig. 4, thereby constricting and tightening the loop 9 around the wires and causing the hooks 19 and 20 to be tightly interlocked and placed under tension to assure a secure locking of the ends of the loop together.

Instead of providing the hook 19 on the end 14 of the loop, I may, as shown in Figs. 5 to 8 inclusive, make a slit or opening 21 therein for reception of the hook 20, the action in this case being the same as in the form of clip shown in Figs. 1 to 4, the end 14 merely having a different form of "hook" or shoulder means to cooperate with the hook 20.

I may use a cushion strip 22 of rubber or the like as a lining for the loop 9 as shown in Figs. 6, 7 and 8, said cushion having rebent flanges 23 to hold it in place and being provided with tubular cushioning ribs 24 to increase the cushioning action. This cushion is applicable to the form of the clip shown in Figs. 1 to 4 and will fit thereon in the same manner as shown in Figs. 6, 7, and 8. When the cushion is used, the rebent flanges 23 may be brought to directly abut the inner surface of the end 14, or the end 14 may be inserted under the flanges to lie against end 15 as shown in Figs. 7 and 8, it being noted that the hook 19 is of such width as to extend between the flanges, to permit of the insertion of the end 14 under the flanges. The opening 21 as shown in Figs. 5 to 8 is also accessible for hooking the hook 20 therein when the end 14 is inserted under as well as positioned over the flanges 23. In the latter case, whether the hook 19 or opening 21 is used, the cushion flanges 23 will exert a force urging the "hooks" into a close and tight interlocked relation.

It is now seen that the hook formation on the end 15 is so arranged that it straddles end 14 so that one portion or area of leg 15 lies against the underside of the end 14 to prevent an outward movement of end 15 as well as inward movement of end 14, while another portion of end 15 confined to a different area of the applied clip lies against the outer side of end 14 to prevent inward movement of end 15 and outward movement of end 14, and end 15 is hooked to end 14, thereby assuring the locking of the clip in the desired clamping and encircling position on the wires or the conduit, regardless of the vibratory and other forces to which the wires or conduit are subjected and which would tend to open a clip not equipped with the locking means of this invention.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a clip for supporting wires or a conduit, a metal strap bent into an open loop having normally spaced apart ends adapted to be brought together to clamp the loop around wires or a conduit, and means for locking said ends to one another upon forcing the ends together including portions of one end arranged to straddle the other end and having portions abutting each other in a flatwise face-to-face manner to prevent such relative movement of the ends inwardly and outwardly of the loop as would unlock them, one of said abutting portions terminating in a locking hook.

2. In a clip for supporting wires or a conduit, a metal strap bent into an open loop having normally spaced apart ends adapted to be brought together to clamp the loop around wires or a conduit, a tongue-like hook struck out from the metal forming the loop at a point spaced inwardly from one end of the loop with the bill of the hook facing inwardly toward the loop, said one end of the loop having an extension distinct from said hook positioned to lie under the other end of the loop when said hook is hooked to said other end, and means on said other end affording the hooking of the hook around a shoulder portion of the other end to lock said ends together.

3. In a clip for supporting wires or a conduit, a metal strap bent into an open loop having normally spaced apart ends adapted to be brought together to clamp the loop around wires or a conduit, a tongue-like hook struck out from the metal forming the loop at a point spaced inwardly from one end of the loop with the bill of the hook facing inwardly toward the loop, a portion of said one end of the loop being inwardly offset from said hook to lie under the other end of the loop when said hook is hooked to said other end, and said other end having an opening therein into which said hook is adapted to be hooked to hold said ends together.

4. In a clip for supporting wires or a conduit, a metal strap bent into an open loop having normally spaced apart ends adapted to be brought together to clamp the loop around wires or a conduit, a tongue-like hook struck out from the metal forming the loop at a point spaced inwardly from one end of the loop with the bill of the hook facing inwardly toward the loop, a portion of said one end of the loop being inwardly offset from said hook to lie under the other end of the loop when said hook is hooked to said other end, and a hook formed on said other end adapted to be hooked to said tongue-like hook to hold said ends together.

EUGENE M. MOREHOUSE.

REFERENCES CITED

The following references are of record in the file of this patent:

UNITED STATES PATENTS

| Number | Name | Date |
| --- | --- | --- |
| 1,246,325 | Rohmer | Nov. 13, 1917 |
| 2,340,713 | Tinnerman | Feb. 1, 1944 |
| 2,338,659 | Morehouse | Jan. 4, 1944 |
| 810,004 | Tabler | Jan. 16, 1906 |
| 1,284,325 | Hart | Nov. 12, 1918 |
| 2,352,856 | Morehouse | July 4, 1944 |
| 441,428 | Mahin | Nov. 25, 1890 |